Sept. 27, 1955 R. D. TOUTON 2,718,891
APPARATUS FOR TREATING TOBACCO
Filed Oct. 17, 1952

INVENTOR.
RUSH D. TOUTON
BY
ATTORNEYS.

United States Patent Office 2,718,891
Patented Sept. 27, 1955

2,718,891

APPARATUS FOR TREATING TOBACCO

Rush D. Touton, Wynnewood, Pa., assignor to Wurton Machine Company, Philadelphia, Pa., a corporation of Pennsylvania Application October 17, 1952, Serial No. 315,237

4 Claims. (Cl. 131—149)

This invention relates to apparatus for treating tobacco.

More particularly this invention relates to apparatus adapted to promote the conditioning of the butts of tobacco leaves.

As is well known, tobacco leaves, in the form of hands comprising a plurality of leaves tied at their butts, are received by the manufacturer of tobacco products, as, for example, cigars, in a dry, brittle state and require conditioning to bring them into a state of flexibility which will permit them to be stemmed and manipulated without damage.

The usual procedure for conditioning tobacco leaves involves applying moistening thereto, as by subjecting the leaves in hands to a humid atmosphere, subjecting them to jets of humid air, and the like. And it has been recognized that the butt portions of the leaves require more drastic treatment to bring them to desired condition than do the leaf portions, which absorb moisture more rapidly than do the butt portions.

In an effort to bring the butt portions of the leaves to proper condition without permitting absorption of excess moisture by the leaf portions, it has been customary to pre-wet the butt portions, as by dipping in water, before applying moisture to the leaf portions, or by subjecting them to a more drastic treatment, as by spraying water on them or subjecting them to jets of air carrying free moisture, while subjecting the leaf portions to a less drastic treatment.

The procedures heretofore used in conditioning of the butt portions of tobacco leaves, as compared with the leaf portions, has left much to be desired and for an approach to satisfactory results has required excessive care.

Again, in the course of the fermentation of tobacco, it is necessary to remove the hands from the bulks and effect a separation of the leaves in order to provide necessary aeration before repacking in the bulks for further fermentation. This separation of the leaves has heretofore been accomplished by hand shaking and twisting of the hands requiring much time and labor and loss through breakage of the leaf portion of the leaves.

Again, due to the tendency of the leaves of the hands to mat, due to resins and gums in and on the leaves after fermentation has been completed, time and labor is required to effect separation of the leaves for stripping.

Now in accordance with this invention apparatus is provided which will operate on the butts of tobacco leaves in hands to insure uniform distribution and absorption of desired moisture by the butt portions of tobacco leaves, the leaf portions of which have been desirably conditioned by moisture absorption; and at the same time apparatus is provided which will operate on the leaf portions of the leaves to manipulate or flex them to effect their separation in the course of fermentation and preparatory to stripping.

More specifically, apparatus according to this invention will be so constructed as to support the leaf portions of hands of tobacco and effect repeated flexing of the butt portions of the hands with respect to the leaf portions.

Again, the apparatus will be so constructed that the flexing of the butt portions of the hands will be effected vertically with respect to the plane of the leaf portions and with the hands in motion in a direction at right angles to their extension. However, if desired the flexing movement of the butt portions may include lateral motion.

Having now indicated, in a general way, the nature and purpose of this invention, I will proceed to a detailed description of preferred embodiments thereof with reference to the accompanying drawing, in which.

Figure 1:
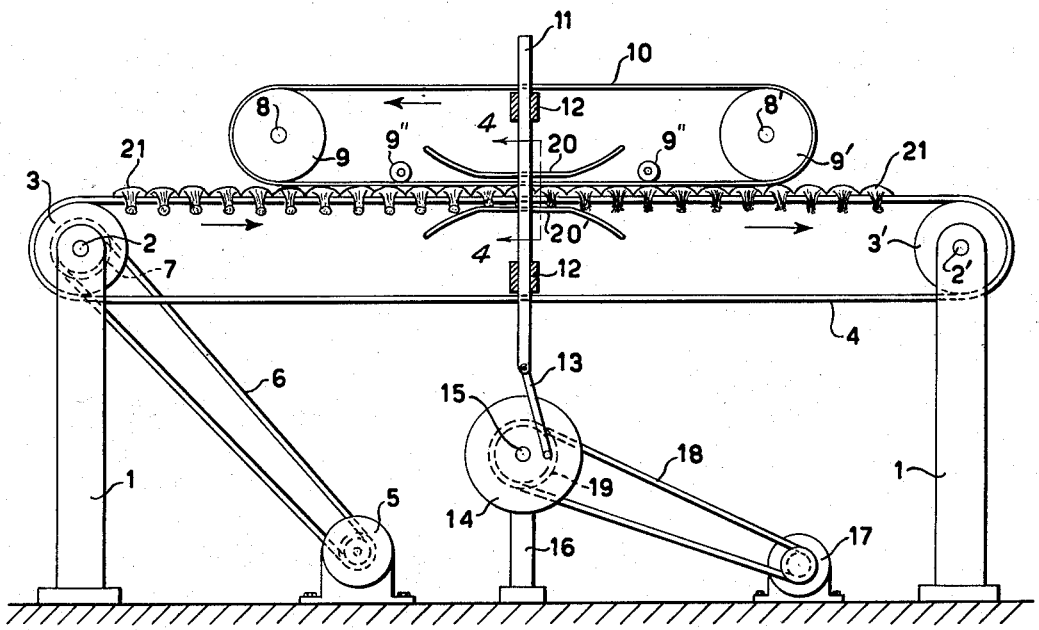
Figure 1 is a side view of apparatus embodying a form of this invention, partly in section.

Referring to Figure 1, frame members 1, 1 support shafts 2, 2' carrying rollers 3, 3' over which extends an endless conveyor belt 4.

The endsless belt 4 is driven by a motor 5, through a belt 6 passing over a pulley 7 on shaft 2.

Suitably supported above the upper reach of endless belt 4 is a pair of shafts 8, 8' carrying rollers 9, 9' about which extend an endless belt 10, the lower reach of which, passing under idlers 9'', 9'', overlies the upper reach of the belt 4.

Midway between the rollers 9, 9' and adjacent to the edges of the adjacent reaches of the belts 4 and 10, a rod 11 extends vertically, through guides 12, 12, respectively positioned above and below the belts, to points above and below the adjacent reaches of the belts. The lower end of rod 11 is pivotally connected to a link 13, which in turn is pivotally connected eccentrically to a disc 14 mounted on a shaft 15 carried by a support 16. The disc is rotated by a motor 17, through a belt 18 passing over a pulley 19 on shaft 15.

The rod 11 carries a pair of oppositely facing spaced shoes 20, 20' which extend in line with the adjacent reaches of the belts 4 and 10. The end portions of the shoes 20, 20', respectively, are bent upwardly and downwardly.

In operation of the apparatus described above with reference to Figure 1, the belt 4 will be driven by motor 5. At the same time, motor 17 will be operated to rotate disc 14, which will, through link 13, effect vertical reciprocation of rod 11, with consequent up and down movement of shoes 20, 20'. The shoes 20 and 20' will be so placed on rod 11 that in their up and down movement they will move above and below the planes of the adjacent reaches of belts 4 and 10.

The motors 5 and 17 being in operation, the leaf portions of hands of tobacco leaves 21, which, for example, have been previously subjected to any usual conditioning treatment and the butt portions of which contain some free moisture, or the butt portions of which have been thoroughly wet, as by dipping, are placed ahead of roller 9 upon the upper reach of the belt 4, which will be traveling in the direction of the arrow, with the butt portions of the hands extending laterally beyond the edge of the belt, a distance of say, for example, 3–4 inches.

In the travel of belt 4 the leaf portions of the hands 21 will pass under the lower reach of belt 10, which will then travel with the upper reach of belt 4 and serve to confine and hold the leaf portions of the hands in their extension on belt 4.

As the butt portions of the hands 21 reach the oppositely bent ends of the reciprocating shoes 20, 20, the butt portions will pass between and be engaged by the shoes, which, in the continued travel of the bands, will flex the butt portions up and down with respect to the leaf portions held between the adjacent reaches of belts 4 and 10.

In their continued travel the butt portions of the hands pass beyond the shoes 20, 20' and the hands are removed from belt 4 beyond rolled 9', by an operator, for further treatment, as, for example, stemming.

The rod 11 may be reciprocated at any convenient rate, say, for example, 40–60 cycles or rotations of disc 14 per minute, and will have a travel such as to elevate and depress the ends of the butt portions say 2–3 inches above and below the plane of the leaf portions. The shoes 20, 21 will be of a length, with respect to the rate of travel of the belt 4, such that the butt portions of the hands will all receive repeated flexing.

It will be noted that the repeated flexing of the butt portions of the hands with respect to the leaf portions, tends to spread the individual butts facilitating their absorption of moisture, and in the flexing upwardly to allow water or free moisture to flow along the butts by gravity, all of which effects even distribution and absorption of moisture by the butt portions.

Again it will be noted that the flexing of the butt portions will cause manipulation or flexing of the leaf portions effecting a separation of the leaves, whether or not moisture is being added to effect moistening of the butts; it being also noted that the throw or vertical current of the shoes 20, 20' and their rate of current can be adjusted so that effective manipulation of the butts and leaf portions of the tobacco will be effected without damaging the leaf portions.

Figure 2:
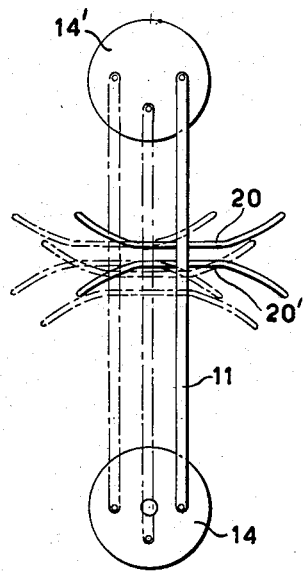
Figure 2 is a side view showing a modification of a detail of the apparatus shown in Figure 1.

Referring now to Figure 2, the lower end of rod 11 carrying shoes 20, 20' is eccentrically pivoted directly to disc 14 with omission of link 13 and its upper end is eccentrically pivoted directly to a similar disc 14', the guides 12, 12 being omitted.

With use of the structure shown in Figure 2, as is indicated in dotted lines, the butt portions of the hands 21 will be given a lateral as well as an up and down flexing or, in effect, a rotary flexing.

Figure 3:
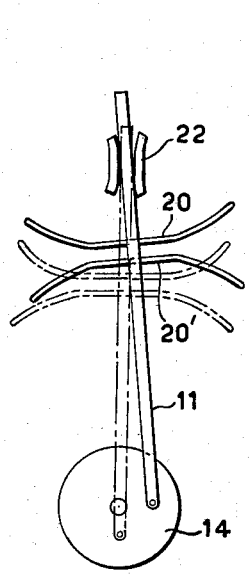
Figure 3 is a side view showing a modification of the detail of the apparatus, shown in Figure 1, over that shown in Figure 2.
Figure 4:
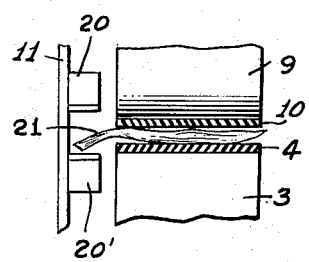
Figure 4 is a section taken on the plane indicated by the line 4—4 in Figure 1.

Referring to Figure 3, the lower end of rod 11, carrying shoes 20, 20', is eccentrically pivoted directly to disc 14 with omission of link 13 and its upper end passes through a loose guide 22 permitting the rod to rock in its reciprocation, thus giving to the butt portions of the hands a partial lateral flexing as well as an up and down flexing.

It will be appreciated that various modifications in detail may be made in the apparatus described above for illustrative purposes without departing from this invention as defined in the accompanying claims.

What is claimed is:

1. Apparatus for treating tobacco comprising a conveyor for the support of the leaf portions of hands of tobacco, reciprocating means positioned to engage the butt portions of the hands at a point in the travel of the conveyor and, in the continued travel of the conveyor, to flex them relative to the leaf portions and means for holding the leaf portions of hands of tobacco on the conveyor when the butt portions are engaged and flexed by the reciprocating means.

2. Apparatus for treating tobacco according to claim 1, characterized by the fact that the conveyor extends horizontally and the reciprocating means moves vertically with respect to the conveyor.

3. Apparatus for treating tobacco according to claim 1, characterized by the fact that the reciprocating means moves vertically and laterally.

4. Apparatus for treating tobacco comprising an endless belt conveyor affording a horizontally extending reach for the support thereon of the leaf portions of hands of tobacco, a rod adjacent to an edge of the horizontally extending reach of the conveyor and extending at an angle to the horizontal, a pair of spaced shoes secured to said rod and having opposed faces extending parallel with and adjacent to the horizontally extending reach of the conveyor, means to reciprocate said rod and leaf holding means comprising an endless belt having a reach overlying the horizontally extending reach of the conveyor through a portion of the extent of the conveyor, said shoes extending between points within the longitudinal extent of the overlying reach of said holding means.

References Cited in the file of this patent

UNITED STATES PATENTS

| | | |
|---|---|---|
| 1,360,850 | Wiseman | Nov. 30, 1920 |
| 2,104,785 | Akeyson | Jan. 11, 1938 |